United States Patent
Samuels et al.

(10) Patent No.: US 7,349,155 B2
(45) Date of Patent: Mar. 25, 2008

(54) SCREEN HAVING A LAYER OF REFLECTORS

(75) Inventors: Brian C. Samuels, Fremont, CA (US); Shih-Yuan Wang, Palo Alto, CA (US); Gregory J. May, Corvallis, OR (US); Stanley Williams, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 10/984,537

(22) Filed: Nov. 8, 2004

(65) Prior Publication Data
US 2005/0128581 A1    Jun. 16, 2005

Related U.S. Application Data

(63) Continuation-in-part of application No. 10/282,818, filed on Oct. 28, 2002, now Pat. No. 7,038,849.

(51) Int. Cl.
*G03B 21/60* (2006.01)
*G02B 27/00* (2006.01)
*G02B 5/04* (2006.01)
*G03F 5/00* (2006.01)
*G02F 1/1335* (2006.01)

(52) U.S. Cl. ............... 359/459; 359/454; 359/601; 359/614; 359/615; 359/893; 349/114

(58) Field of Classification Search ............ 359/443, 359/454, 459, 599, 601, 613, 614, 615, 893; 349/114
See application file for complete search history.

(56) References Cited

U.S. PATENT DOCUMENTS

| | | | | |
|---|---|---|---|---|
| 2,713,286 A | * | 7/1955 | Taylor | 359/541 |
| 3,801,183 A | * | 4/1974 | Sevelin et al. | 359/537 |
| 4,957,335 A | * | 9/1990 | Kuney, Jr. | 359/541 |
| 5,111,337 A | | 5/1992 | Martinez | |
| 5,148,309 A | | 9/1992 | Yamada et al. | |
| 5,153,481 A | | 10/1992 | Matsuda et al. | |
| 5,514,461 A | | 5/1996 | Meguro et al. | |
| 5,521,759 A | | 5/1996 | Dobrowolski et al. | |

(Continued)

FOREIGN PATENT DOCUMENTS

DE    298 13 364 U1    11/1998

(Continued)

OTHER PUBLICATIONS

Samuels Brian C., et al., U.S. Appl. No. 10/282,818, filed Oct. 28, 2002 (30 pages).

*Primary Examiner*—Diane I. Lee
*Assistant Examiner*—Magda Cruz

(57) ABSTRACT

A reflector comprises a core and a first dielectric mirror formed over at least a portion of the core to reflect light having a preselected wavelength. The reflector may comprise a plurality of dielectric mirrors formed concentrically over the first dielectric mirror to reflect light having the preselected wavelength. The multiple dielectric mirrors may have different diffraction indices. A layer of such reflectors deposited onto the reflective surface of a projection screen may enhance the reflective selectivity of the screen to the preselected wavelength. Reflectors formed to reflect different wavelengths may be deposited onto the reflective surface to enhance selectivity to the different wavelengths and minimize reflection of ambient light.

18 Claims, 8 Drawing Sheets

U.S. PATENT DOCUMENTS

| | | | |
|---|---|---|---|
| 5,523,649 A | 6/1996 | Tong et al. | |
| 5,604,027 A | 2/1997 | Sheridon | |
| 5,621,487 A | 4/1997 | Shirochi | |
| 5,715,083 A | 2/1998 | Takayama | |
| 6,013,370 A | 1/2000 | Coulter et al. | 428/403 |
| 6,095,652 A | 8/2000 | Trayner et al. | |
| 6,124,851 A | 9/2000 | Jacobson | |
| 6,144,491 A | 11/2000 | Orikasa et al. | |
| 6,404,548 B1 | 6/2002 | Tatsuki et al. | |
| 6,449,089 B1 | 9/2002 | Moshrefzadeh et al. | |
| 6,468,341 B2 | 10/2002 | Wada et al. | 106/413 |
| 6,473,072 B1 | 10/2002 | Comiskey et al. | |
| 6,692,830 B2 | 2/2004 | Argoitia et al. | 428/403 |
| 6,749,936 B2 | 6/2004 | Argoitia et al. | 428/402 |
| 6,841,238 B2 | 1/2005 | Argoitia et al. | 428/323 |
| 7,036,944 B2 * | 5/2006 | Budd et al. | 359/536 |
| 2002/0154382 A1 | 10/2002 | Morrison et al. | |
| 2005/0094265 A1 | 5/2005 | Wang | |
| 2005/0137283 A1 | 6/2005 | Frese et al. | 523/160 |

FOREIGN PATENT DOCUMENTS

JP            01-298323        12/1989

* cited by examiner

SCREEN HAVING A LAYER OF REFLECTORS

CROSS-REFERENCE TO RELATED APPLICATIONS

This application is a continuation-in-part of U.S. Ser. No. 10/282,818, filed Oct. 28, 2002, now U.S. Pat. No. 7,038,849, the entire contents of which are incorporated herein by reference thereto.

STATEMENT REGARDING FEDERALLY SPONSORED RESEARCH OR DEVELOPMENT

Not applicable.

REFERENCE TO AN APPENDIX

Not applicable.

BACKGROUND

1. Technical Field

The invention relates generally to enhancing the reflection of selected light.

2. Description of Related Art

Projection systems of both front projection, reflective viewing, and rear projection, transmissive viewing, are known in the art. A common problem in projection systems is that ambient lighting conditions reduce contrast and degrade viewing image quality.

Typical projection technology focuses on hardware and electrical design of the projector to improve the color image quality of the projected image. A typical projector uses red, green and blue ("RGB") filters in combination with a light source additively or temporally (sequencing in time) to create a range, or gamut, of possible colors. Considerable constraints exist for the selection of these filters, such as wavelength of peak absorption, spectrum bandpass, cost, durability, and the like factors known to those skilled in the art. Moreover, the screen is typically a mostly spectrally non-selective material that appears white or silver and may be retroreflective.

BRIEF SUMMARY

The invention generally provides for a spectrally selective reflector, a spectrally selective projection screen employing such reflectors, a method for enhancing the spectral selectivity of an object such as a projection screen with such reflectors, and a projection system.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference designations represent like features throughout the drawings. The drawings in this specification should be understood as not being drawn to scale unless specifically annotated as such.

DETAILED DESCRIPTION

The present inventive concept may be used, inter alia, to enhance optical properties of a screen on which an image is projected. Wavelength selectivity is employed to improve the color qualities of the reflected image.

Figure 1:
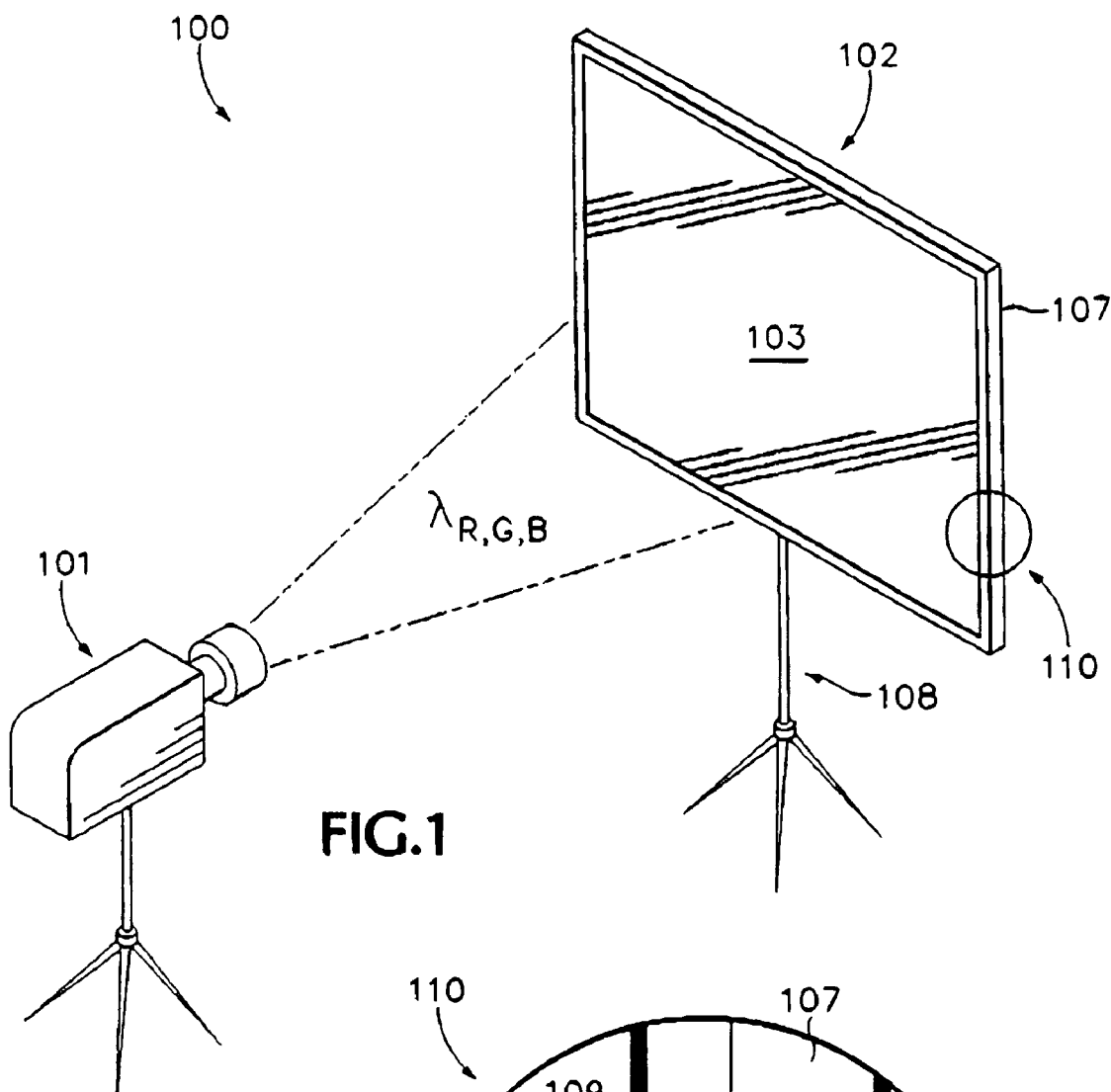
FIG. 1 is a schematic depiction of a front projection system illustrating a screen with a viewing region having spectrally selective properties in accordance with an embodiment of the present disclosure.
Figure 1A:
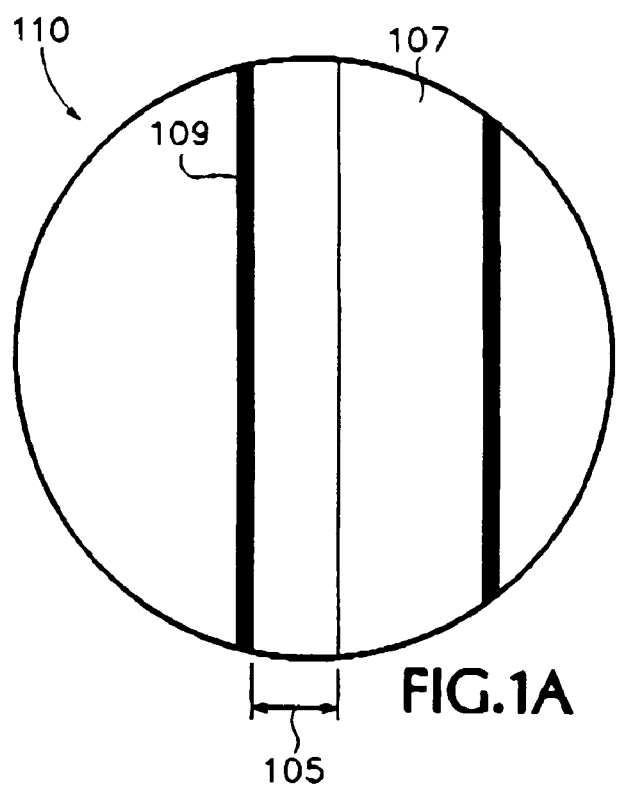
FIG. 1A is a detail region of FIG. 1.

FIG. 1 is a perspective view, schematic illustration, showing a reflecting screen projection system 100. FIG. 1A is a magnified detail 110 of the reflective projection screen 102 of the system 100 as shown in FIG. 1.

Image and information projection apparatus, generically referred to as a "projector," 101 are known in the art. An exemplary red-green-blue, "RGB," color projector 101 provides a projection, represented by a schematic, phantom-line, "beam region" labeled $\lambda_{R,G,B}$, onto a viewing screen 102 having a viewing surface region 103. The screen 102 has a support, or frame, 107 and a stand 108.

Looking also to FIG. 1A, the viewing surface region 103 includes a substrate 105 and a surface coating 109. The substrate 105 can be any material that will accept the coating 109. Preferably, the substrate 105 is a flexible material since most reflective projection screens 102 are preferred to be of the well-known roll-up style (not shown).

Figure 2:
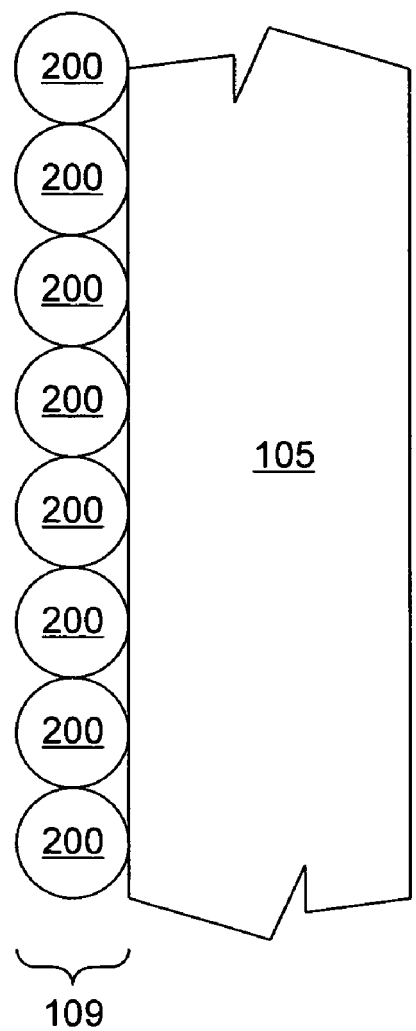
FIG. 2 is a schematic depiction of a portion of a projection screen in accordance with an embodiment of the present disclosure.

In accordance with one exemplary embodiment disclosed herein, and with reference now to FIG. 2, the coating 109 includes one or more reflectors 200 deposited onto the substrate 105. For discussion purposes, the coating is shown as comprising a plurality of reflectors 200, but it must be understood that the present embodiment contemplates coatings 109 comprising any number, including one, of reflectors 200 as described hereinafter. FIG. 2 is not drawn to scale, and is enlarged to show detail.

Figure 3:
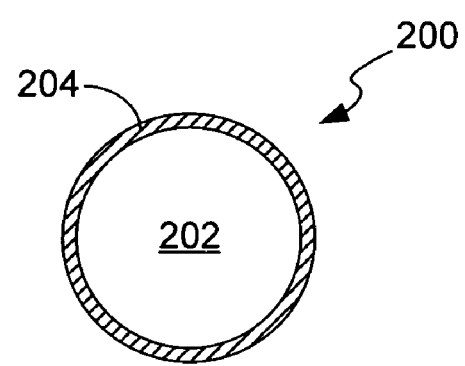
FIG. 3 is a schematic depiction of a reflector in accordance with an embodiment of the present disclosure.

With reference to FIG. 3, each reflector 200 may include a core 202 and at least one layer 204 consisting of a dielectric mirror overlying at least a portion of the core. Again, the figure is not to scale and is enlarged to show detail. The core may be formed in any shape practicable, and is shown as spherical in the figures for discussion purposes only. Similarly, dielectric mirror layer 204 is shown as overlying the entire core 202 only for discussion purposes and is but one of many possible implementations in accordance with the present invention.

Dielectric mirrors, also known as Bragg mirrors or Bragg reflectors, are a sub-class of photonic crystals that comprise multiple layers of different refractive index chosen so that light of a certain wavelength is reflected at each layer interface and all other light is transmitted. In dielectric mirrors, the layers are formed so that the phase of the reflected light waves add up constructively in a certain direction, and thus light with wavelength matching the periodicity index of the dielectric mirror is almost completely reflected, while all other light is transmitted therethrough.

In one exemplary embodiment, reflectors 200 are formed with a dielectric mirror layer 204 that has been formed to reflect light having a preselected wavelength $\lambda_R$. Thus, when a light beam is projected onto such a reflector, any component of the light beam having wavelength $\lambda_R$ will be almost completely reflected and all other components of the light beam will be transmitted through the dielectric mirror layer to impinge onto the core 202.

In one exemplary embodiment, the core 202 may be formed of a substantially light-absorbing material, such as a black material. By depositing one or more such reflectors 200 on the substrate 105 of a projection screen 102, the projection screen will selectively reflect more of light having wavelength $\lambda_R$ than light having other wavelengths. Thus, by selecting $\lambda_R$ to correspond to a certain color, such as a color perceived by the human eye, reflectors 200 deposited onto a screen 102 will enhance the reflectivity of that screen for that particular color.

Figure 4:
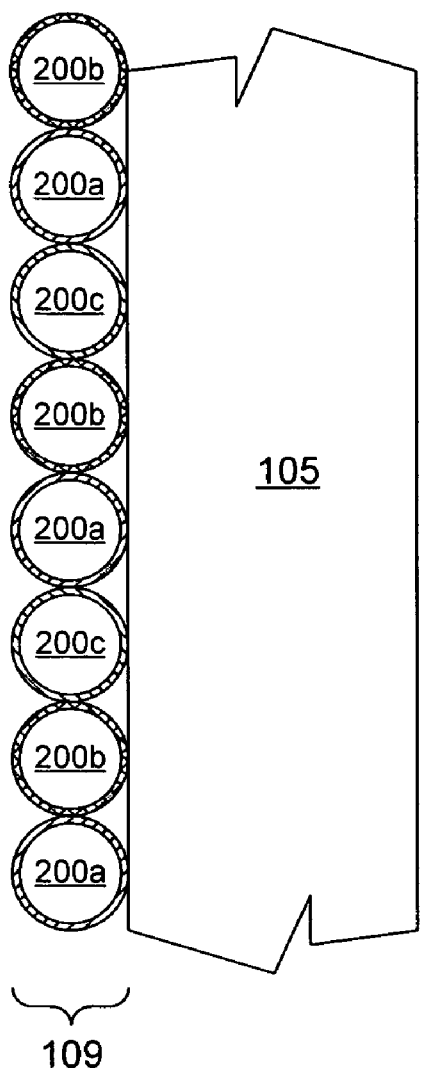
FIG. 4 is a schematic depiction of a portion of another projection screen in accordance with an embodiment of the present disclosure.

In accordance with another exemplary embodiment disclosed herein, and with reference now to FIG. 4, different reflectors 200a, 200b, 200c may be formed to reflect light of different wavelengths $\lambda_{Ra}$, $\lambda_{Rb}$, $\lambda_{Rc}$, respectively. Such reflectors deposited onto a projection screen will enhance the reflectivity of the screen to all three such wavelengths $\lambda_{Ra}$, $\lambda_{Rb}$, $\lambda_{Rc}$. These three wavelengths may be chosen to correspond to red, green, and blue light, and thus match the three-color light output of one known type of projector. In a still further, highly advantageous exemplary embodiment, the various wavelengths $\lambda_{Ra}$, $\lambda_{Rb}$, $\lambda_{Rc}$ may be chosen to correspond substantially exactly to the various wavelengths being output by a particular projector, thereby providing a method for matching the reflectivity characteristics of a particular projector screen to the light beam(s) characteristics of a particular projector. A screen 102 with a coating 109 comprised of reflectors with dielectric mirror layers 204 having such selectively matched reflective wavelengths will thus selectively reflect substantially only the light being output by its matched projector and largely absorb ambient light. Such a screen will thereby provide a much more color accurate picture and display more vivid, brighter colors.

To enhance the absorption of ambient light, in one exemplary embodiment contemplated herein, the surface of the substrate 105 underlying the coating 109 may be colored black, to thereby absorb substantially all light transmitted (i.e. not reflected) by the reflectors 200 in the coating 109. It must be noted that the scope of the invention is not limited to embodiments wherein only red, green and blue light is selectively reflected by the reflectors 200 in a coating 109 for a projector screen 102. Reflectors 200 may be formed to selectively reflect light of any wavelength, whether visible to the human eye or not. For example, an implementation of a screen may be formed with coatings 109 of different reflectors 200 to reflect, among others, ultraviolet light and/or infrared light.

Figure 5:
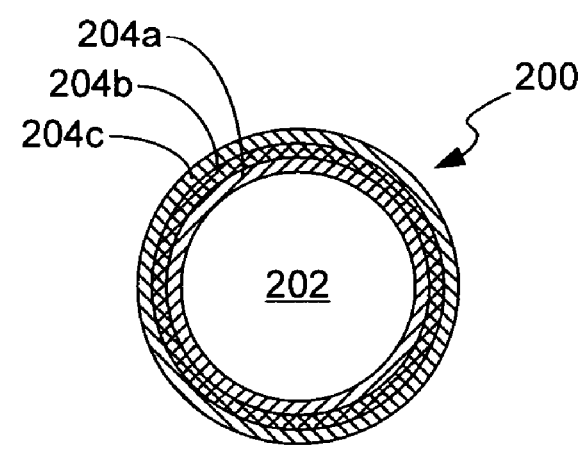
FIG. 5 is a schematic depiction of another reflector in accordance with an embodiment of the present disclosure.

With reference now to FIG. 5, which is not to scale and is enlarged to show detail, in another exemplary embodiment disclosed herein, reflectors 200 may be formed with multiple dielectric mirror layers 204a, 204b, 204c, etc. overlying the core 202. In one exemplary embodiment, each dielectric mirror layer 204a, 204b, 204c of one reflector 200 may be formed to reflect light of a different wavelength $\lambda_{Ra}$, $\lambda_{Rb}$, $\lambda_{Rc}$. In another exemplary embodiment, the multiple dielectric mirror layers 204a, 204b, 204c of one reflector may be formed to reflect light of the same wavelength $\lambda$, and each dielectric mirror layer 204a, 204b, 204c may further be formed with a different diffraction index than the other dielectric mirrors of the respective reflector. In another exemplary embodiment, the multiple dielectric mirror layers 204a, 204b, 204c of one reflector may be formed to reflect light of the same wavelength $\lambda$, and the dielectric mirror layers 204a, 204b, 204c may further be formed with an alternating diffraction index. In one exemplary embodiment, the diffraction index may vary from one dielectric mirror layer to another by $\frac{1}{4}\lambda$. In this manner, the selectivity of each reflector for the particular selected wavelength $\lambda$ is significantly improved and the reflector 200 overall reflects light of wavelength that is more narrowly centered on the particular wavelength $\lambda$. Although only three dielectric mirror layers 204a, 204b, 204c are depicted in the figures, the invention contemplates the use of any desirable and practicable number of such dielectric mirror layers.

Figure 6:
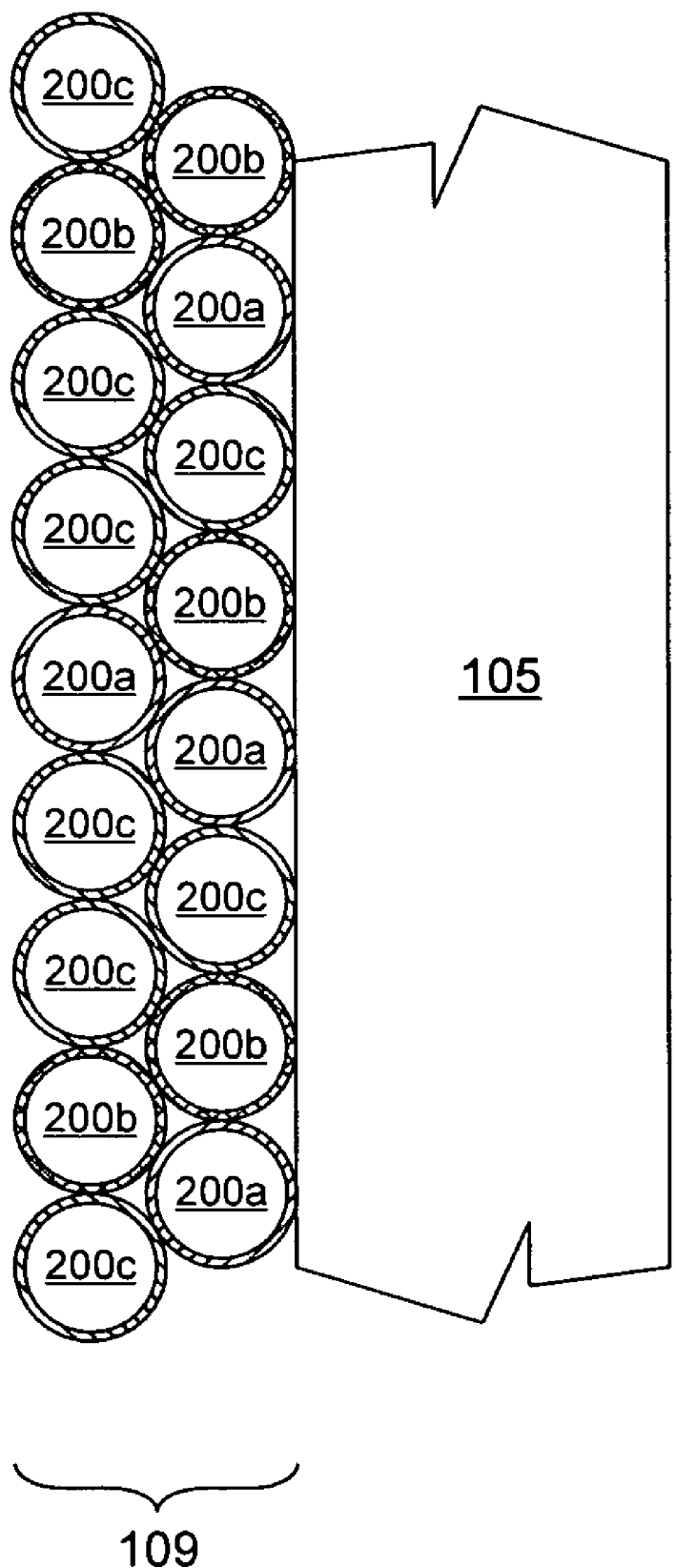
FIG. 6 is a schematic depiction of a portion of another projection screen in accordance with the present disclosure.

With reference once again to FIG. 2, in one exemplary embodiment disclosed herein, a coating 109 may be formed on a substrate 105 of a screen to comprise substantially one layer of reflectors 200. As shown in FIG. 6, in another exemplary embodiment, a coating 109 may be formed on a substrate 105 of a screen to comprise two (shown) or more (not shown) layers of reflectors 200. As shown in FIG. 4, in one exemplary embodiment disclosed herein reflectors 200a, 200b, 200c, etc. formed to reflect different wavelengths $\lambda_{Ra}$, $\lambda_{Rb}$, $\lambda_{Rc}$ may be disposed in equal ratios to form the coating 109. As shown in FIG. 6, in one exemplary embodiment disclosed herein reflectors 200a, 200b, 200c, etc. formed to reflect different wavelengths $\lambda_{Ra}$, $\lambda_{Rb}$, $\lambda_{Rc}$ may be disposed in different ratios to form the coating 109. In this manner, and with reference to the disclosure elsewhere herein directed to matching the selective reflectivity of a coating 109 on a screen 102 with the light output of a particular projector 101, the ratio of selective reflectivity of each color may be matched to the output of a particular projector. Thus, by way of an example for discussion purposes only, if a particular projector emits light that has a comparatively low or weak red component as compared to the other components, a screen 101 may be coated in accordance with the principles disclosed herein to contain a higher ratio of reflectors 200 that reflect red light than reflectors that reflect other color light, thereby enhancing the reflectivity of the screen to red as opposed to other colors and compensating for the reduced red light output of the projector.

Reflectors according to the present disclosure may be formed in any shape as well as any size practicable or desirable. It is currently believed that to form coatings for currently available projector screens, an overall reflector diameter of 50 microns or less may be desirable. Forming reflectors 200 with micron dimensions may also expand the possibilities for forming the coating 109. In one exemplary embodiment, reflectors 200 may be deposited by an inkjet printer onto a substrate 105 to form coating 109 thereon. Inkjet printers are known to provide low cost operation and highly accurate positioning of the printhead, and would thereby enable depositing the reflectors 200 with high accuracy and forming intricate patterns, as described elsewhere herein. The invention contemplates any other method of depositing reflectors onto any substrate.

The invention must not be understood as limited by anything other than the provision of one or more reflectors as disclosed herein, for any purpose, and onto any object. Such objects may include, but are not limited to, objects of art, decorations, clothing, furniture, and toys. Reflectors 200 may be deposited onto other objects to enhance their reflective properties, for utilitarian or decorative purposes. Thus, in another exemplary embodiment, reflectors 200 reflecting red, green and blue may be deposited onto the individual lights of a traffic signal so as to enhance their reflection of the particular light emitted. For instance, reflectors formed to reflect red may be deposited onto the red light of a traffic signal, which will cause it to reflect red light from the ambient light and absorb most of the rest of ambient light, thereby rendering it a brighter red when lit. The same is true of the green and yellow lights.

Reflectors 200 formed to reflect particular colors may be deposited onto cars or clothing for enhanced night-time safety. For instance, in another exemplary embodiment, reflectors may be deposited in particular patterns or to spell out words so that the patterns or words will effectively glow in a certain color or colors, depending on the wavelengths reflected by the particular reflectors, when illuminated by ambient or white light. This can also be practiced for purely aesthetic reasons, to enhance the appearance of fabrics or objects when illuminated by ambient light or by particular types of lights, such as the ubiquitous "black lights" found in bars and night clubs.

Reflectors 200 may be packaged in a liquid or semi-liquid medium and distributed for general consumption, such that individual users may apply the reflectors to any surface of their choosing, including hair and skin to thereby function as makeup. Reflectors suspended in a solution will render that solution selectively reflective, and therefore further uses of the reflectors disclosed herein can be visualized, such as dispersing the reflectors in pools or aquariums for aesthetic reasons.

In accordance with another exemplary embodiment, reflectors 200 may be formed to selectively transmit, rather than reflect, light. Thus, reflectors may be formed layers 204 consisting of dielectric, or Bragg, filters that are formed to transmit light having a preselected wavelength $\lambda_T$.

In other exemplary embodiments disclosed herein, the coating 109 may comprise reflectors 200 disposed in a predetermined pattern or mosaic. In one exemplary embodiment the mosaic may be formed of red, green and blue "pixels," wherein each pixel is a reflector formed to reflect a particular wavelength or color, and may include superpixels, where a "superpixel" is a contiguous group of more than one like-colored (i.e. reflective of the same wavelength) individual pixel or reflector. Sample mosaics 301, 401, 501, 601 are shown respectively in FIGS. 7, 8, 9 and 10, and described in more detail hereinafter. Individual pixels are shown as squares of color and superpixels are shown as rectangular geometric constructs for ease of understanding; it should be recognized that no limitation on the scope of the invention is intended by these exemplary square pixels and constructs. As previously noted, reflectors according to the present disclosure may be formed in any shape and any size practicable. Specifically, patterns can be developed for both the additive primary colors (red, green, blue), the subtractive primary colors (cyan, magenta, yellow), combinations, or other color systems.

In the exemplary embodiments shown, the color mosaic pattern types were constructed to resemble a frequency-modulated halftoning pattern or white noise that has been low-pass filtered. Other pattern types may be used, but a frequency-modulated halftoning screen or white noise types are preferred in that they minimize structure visibility. Moreover, a frequency-modulated halftoning screen or white noise type allows an equal amount of red, green and blue pixels in the total resolution count, i.e., a 1:1:1 ratio of RGB. Note that it is envisioned that a different balance to the relative numbers of red, green and blue may be used to achieve a specific reflective or, in rear projection, transmissive, color shift or enhancement; each such unbalanced exemplary mosaic pattern of FIGS. 4, 5 and 6 and its purpose is described hereinafter.

Figure 7:
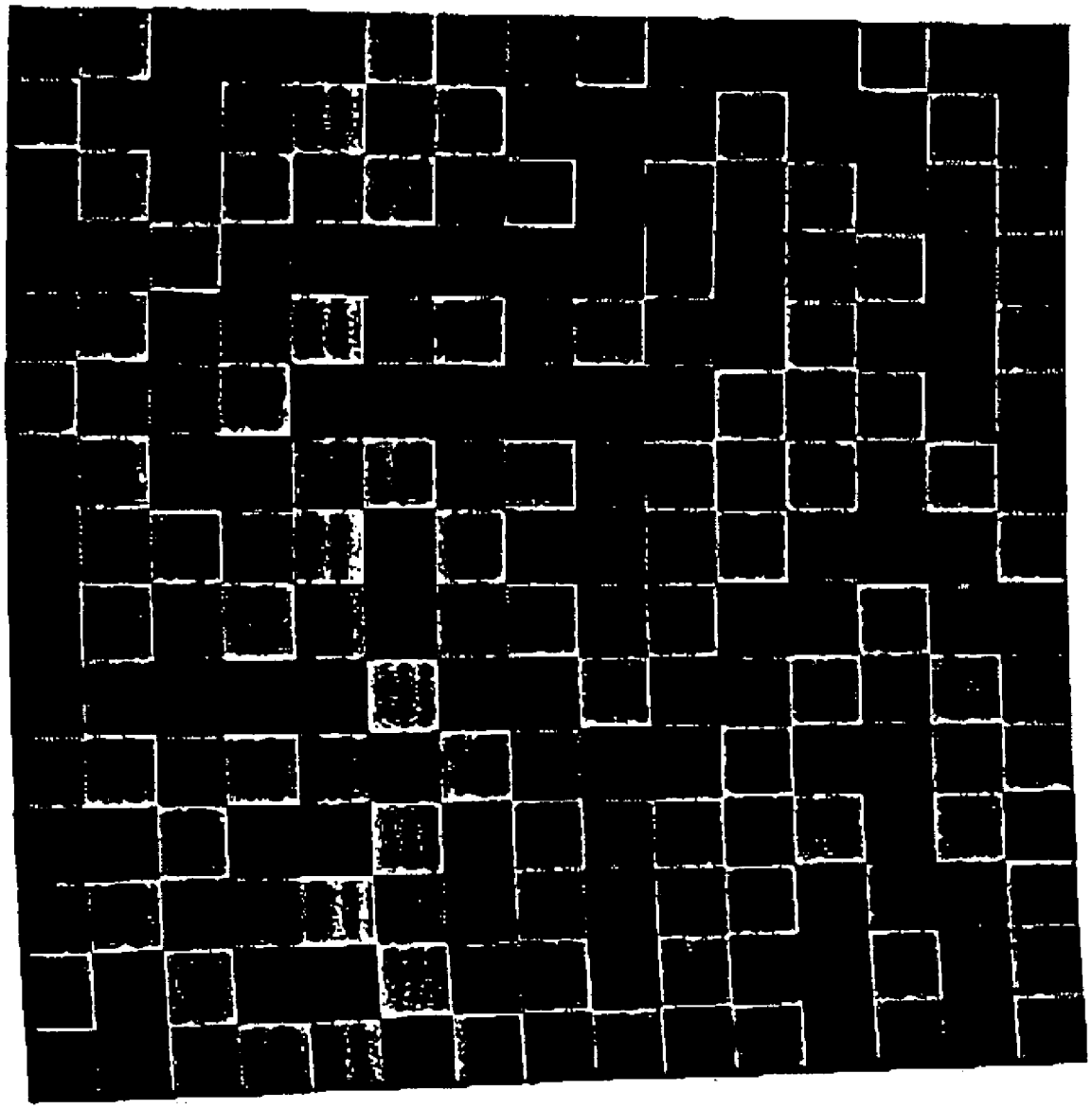
FIG. 7 is a color drawing representing a first embodiment of a surface mosaic having a pattern for enhancing screen chromaticity of the viewing region shown in FIGS. 1 and 1A.

Looking now in more detail at FIG. 7 in conjunction with FIGS. 1 and 1A, an enlargement of a portion of the printed red, green and blue patterned mosaic 301 used for the coating 109 of the screen viewing region 103 is shown. In an experimental exemplary embodiment, this mosaic 301 was repeated, or tiled, to a size of roughly 38 cm² such that each individual pixel square is approximately 0.5 mm². To the naked eye, the printed simulation appears to be a dark gray with a texture that is difficult to resolve at viewing distances of greater than one meter.

Ideally, the goal is to achieve a screen coating having a mosaic that will provide a spectral reflectance curve with roughly three maxima, or peaks, centered at roughly the same peak emission wavelengths of the given projector, as mentioned elsewhere herein. It has been found that red and blue light reflectance is enhanced using the pattern of FIG. 7 or, in other words, the chromaticity measured for reflected red and blue primaries is increased.

It may be noted that the wavelengths for optimization of the screen are generally specific to the human visual system. Additive primaries of roughly 450, 540, and 605 nanometers have a high degree of visual efficiency and result in larger display gamuts. Such optimum wavelength characteristics can be used as a design guide for a wavelength selective screen for a particular implementation.

Figure 8:
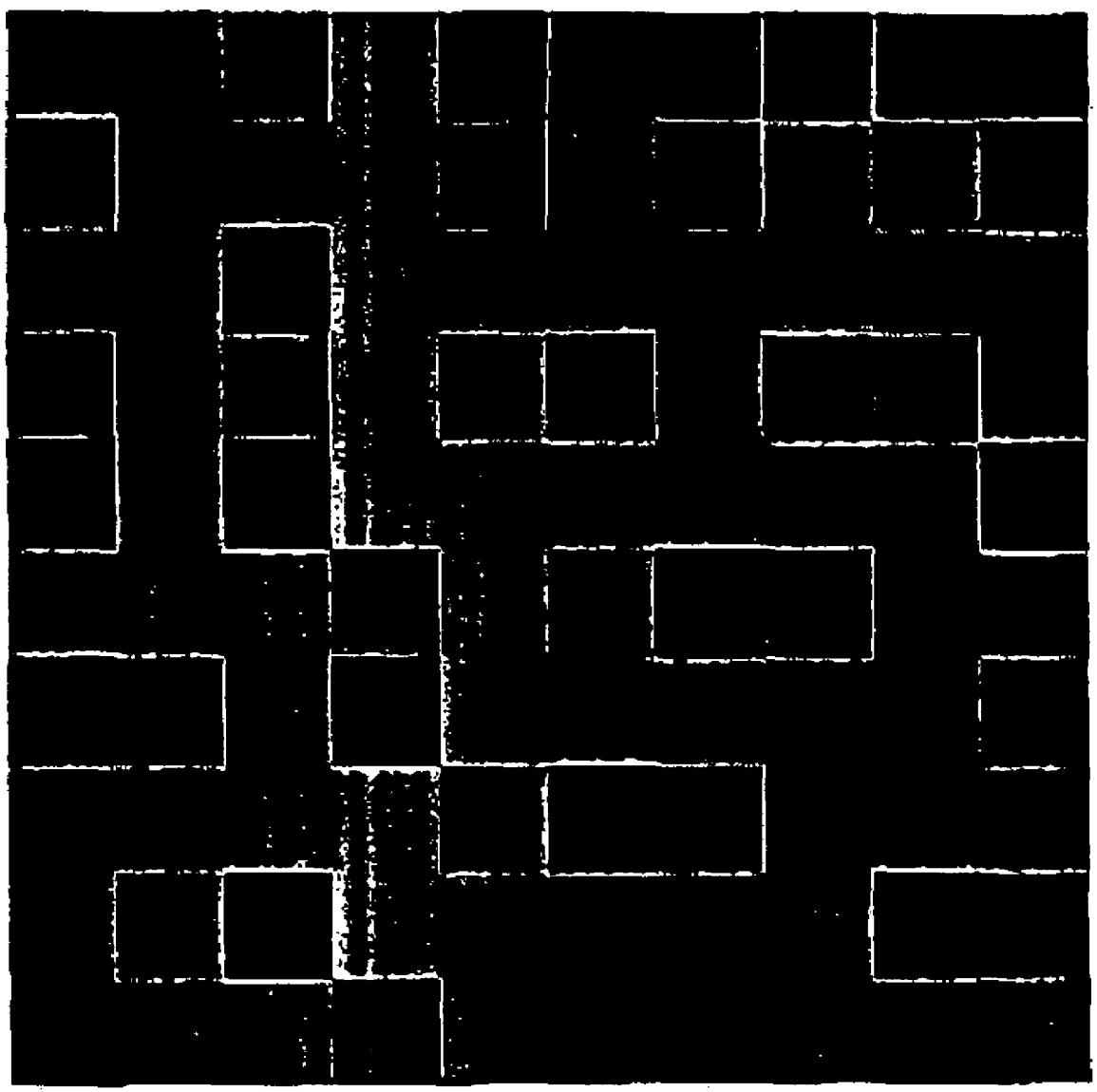
FIG. 8 is a color drawing representing a second embodiment of a surface mosaic having a pattern for improving red chromaticity of the viewing region shown in FIGS. 1 and 1A.

The mosaic 401 of FIG. 8 is an example of a pattern balance other than 1:1:1 which incorporates an increase in the number of red pixels and superpixels. Thus, it should be suited for a projection system 100 in which the given projector 101 has a relatively weak red wavelength gamut peak emission characteristic.

Figure 9:
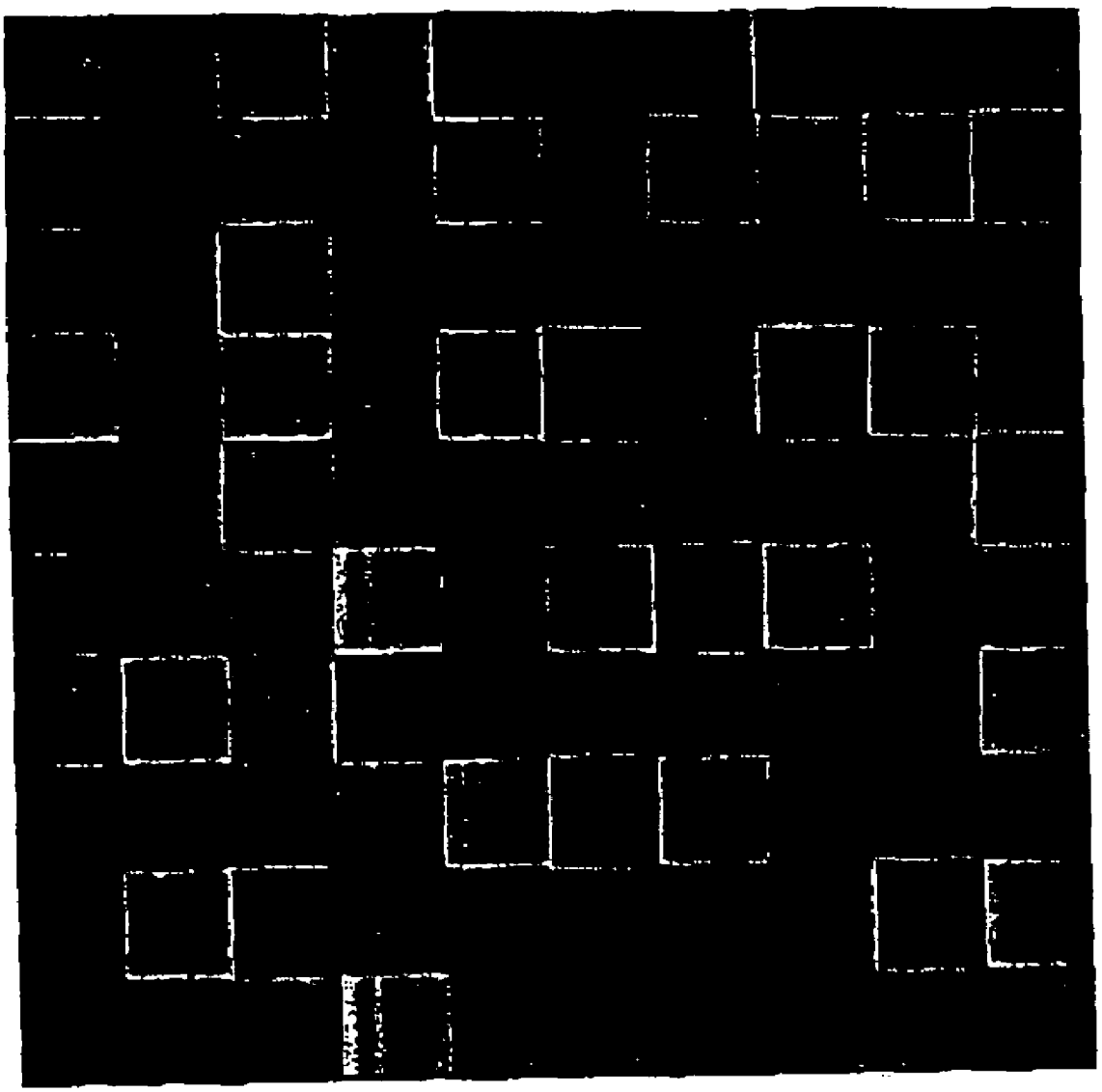
FIG. 9 is a color drawing representing a third embodiment of a surface mosaic having a pattern for improving green chromaticity of the viewing region shown in FIGS. 1 and 1A.

The mosaic 501 of FIG. 9 is an example of a pattern balance which incorporates an increase in the number of green pixels and superpixels. Thus, it should be suited for a projection system 100 in which the given projector 101 has a relatively weak green wavelength gamut peak emission characteristic.

Figure 10:
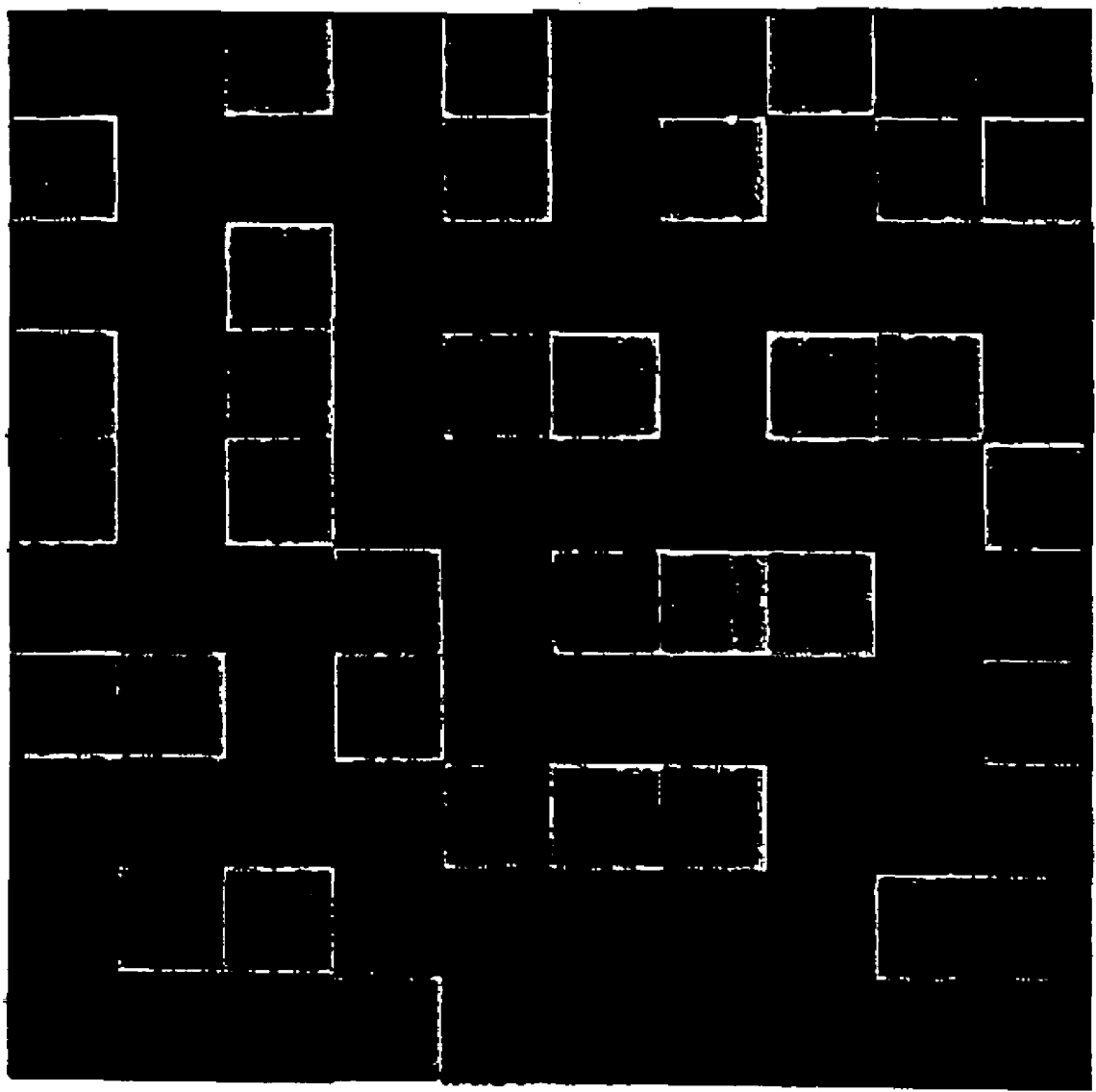
FIG. 10 is a color drawing representing a fourth embodiment of a surface mosaic having a pattern for improving blue chromaticity of the viewing region shown in FIGS. 1 and 1A.

The mosaic 601 of FIG. 10 is an example of a pattern balance which incorporates an increase in the number of blue pixels and superpixels. Thus, it should be suited for a projection system 100 in which the given projector 101 has a relatively weak blue wavelength gamut peak emission characteristic.

The basic idea of tailoring a screen coating 109 to match the emission characteristics of a given projector 101 can be extended to providing a mosaic pattern where the relative amount of two primaries at the same time is employed.

It should be recognized that the present invention as applied to projections systems not only enhances the imaging performance of existing projectors, but in addition permits the designer of the projector an additional degree of freedom. For example, one can optimize the spectral reflectivity of the screen to enhance the projected image performance of a given projector by reducing reflected ambient light, enhancing the reflection of specific spectral regions to accommodate the properties of the projected light (i.e. make up for weak red output of a projector), or both.

As another example, one can optimize the projected spectrum of the projector to the spectral reflectivity of the screen. As yet another example, one can optimize the projected spectrum of the projector and the spectral reflectivity of the screen together to maximize the overall improvement in image properties and potentially reduce the cost of the projector—through a reduction of ambient light and enhanced reflectivity of specific spectral regions that improve the image performance—such as increasing the reflectivity of red light over green and blue. Optimizing both together is likely to produce the best overall results for cost and performance.

Yet another exemplary option is to make a generic screen that improves performance for most existing projectors. This would be much like the neutral gray screens presently available for home projection systems but this one would uses designed spectral reflectivity to improve it's performance.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A screen, comprising:
   a substrate;
   a layer of reflectors on the substrate, each reflector including a core and at least one dielectric mirror formed over at least a portion of the core to reflect light having a preselected wavelength; and
   wherein the reflectors are disposed on the substrate in a mosaic pattern that is configured to simulate low-pass filtered white noise.

2. The screen of claim 1, wherein the layer of reflectors comprises reflectors formed to reflect light having different preselected wavelengths.

3. The screen of claim 2, wherein each reflector is formed to reflect light having a particular preselected wavelength selected from among the group of wavelengths corresponding to red, green, blue, cyan, magenta, yellow, infrared and ultraviolet light.

4. The screen of claim 2, wherein the layer of reflectors comprises a substantially equal number of reflectors formed to reflect light having each of the preselected wavelengths.

5. The screen of claim 2, wherein the reflectors in the layer of reflectors are disposed substantially in a single plane.

6. The screen of claim 2, wherein the reflectors in the layer of reflectors are disposed in a plurality of overlying planes.

7. The screen of claim 2, where each of the reflectors in the layer of reflectors is formed to reflect light having a wavelength preselected to match a wavelength emitted by a predetermined light source.

8. The screen of claim 7, wherein each reflector is formed to reflect light having a wavelength preselected from a group of wavelengths corresponding to wavelengths emitted by the predetermined light source.

9. The screen of claim 7, wherein the mosaic pattern is selected to enhance a reflectivity of the screen with respect to at least one wavelength emitted by the light source.

10. The screen of claim 9, wherein the mosaic pattern is selected to simulate a frequency-modulated halftoning screen.

11. The screen of claim 1, wherein at least one dielectric mirror of each reflector is formed with a diffraction index that is different from the other dielectric mirrors.

12. The screen of claim 1, wherein each dielectric mirror of each reflector is formed with a diffraction index that varies from at least one adjoining dielectric mirror by approximately one fourth of the preselected wavelength.

13. The screen of claim 1, wherein the core of each reflector is substantially spherical.

14. The screen of claim 13, wherein the core of each reflector has a diameter of less than 50 microns.

15. The screen of claim 1, wherein the core is formed of a substantially light-absorbent material.

16. The screen of claim 1, wherein the substrate is formed of a substantially light-absorbent material.

17. A screen, comprising:

a substrate;

a layer of reflectors on the substrate, each reflector including a core and at least one dielectric mirror formed over at least a portion of the core to reflect light having a preselected wavelength; and wherein each dielectric mirror of each reflector is formed with a diffraction index that varies from at least one adjoining dielectric mirror by approximately one fourth of the preselected wavelength.

18. A screen, comprising:

a substrate;

a layer of reflectors on the substrate, each reflector including a core and at least one dielectric mirror formed over at least a portion of the core to reflect light having a preselected wavelength; and wherein the at least one dielectric mirror of each reflector is formed with a diffraction index that is different from other dielectric mirrors.

* * * * *